June 1, 1954 A. M. LESSARD Re. 23,833

SAFETY SWITCH

Original Filed July 18, 1950

INVENTOR.

A. M. LESSARD

BY

Cook & Robinson

Reissued June 1, 1954

Re. 23,833

UNITED STATES PATENT OFFICE 23,833

SAFETY SWITCH

Alfred M. Lessard, Snoqualmie, Wash.

Original No. 2,626,328, dated January 20, 1953, Serial No. 174,396, July 18, 1950. Application for reissue March 9, 1954, Serial No. 415,187

4 Claims. (Cl. 200—51)

Matter enclosed in heavy brackets [ ] appears in the original patent but forms no part of this reissue specification; matter printed in italics indicates the additions made by reissue.

This invention relates to safety switches for use in connection with the batteries of automobiles, tractors, airplanes, etc., where instant and easy opening of circuits supplied by a battery is desirable, especially from the standpoint of safety, convenience for repair of circuits and for other reasons.

It is the principal object of this invention to provide a practical, safe, and efficient switch mechanism that may be easily and readily applied to a battery terminal, and which switch comprises as a part thereof, a terminal post that is adapted to be electrically connected with or disconnected from the battery terminal through the mediacy of the switch mechanism, and to which post a battery cable may be applied in the same manner as it is ordinarily applied to the battery terminal.

It is also an object of this invention to provide a switch mechanism of the character above stated having circuit contacts adapted to be engaged or disengaged for the purpose of closing and opening a circuit between the battery terminal to which the switch is applied and the terminal post of the switch, and which contacts are mounted by hingedly joined members with which a toggle linkage is associated and through which linkage the switch opening or closing action is effected.

It is a further object of the invention to provide a switch, as above stated, wherein the toggle linkage is adapted to be manually actuated by a pull rod, cable, or the like, which may be extended to a point at which it is easily accessible to the operator of the vehicle in which the battery is used.

Still further objects of the invention reside in the details of construction and combination of parts embodied in the device and in the mode of use of the switch as will hereinafter be fully described.

In accomplishing these and other objects of the invention, I have provided the improved details of construction, the preferred forms of which are illustrated in the accompanying drawings, wherein.

Figure 1:
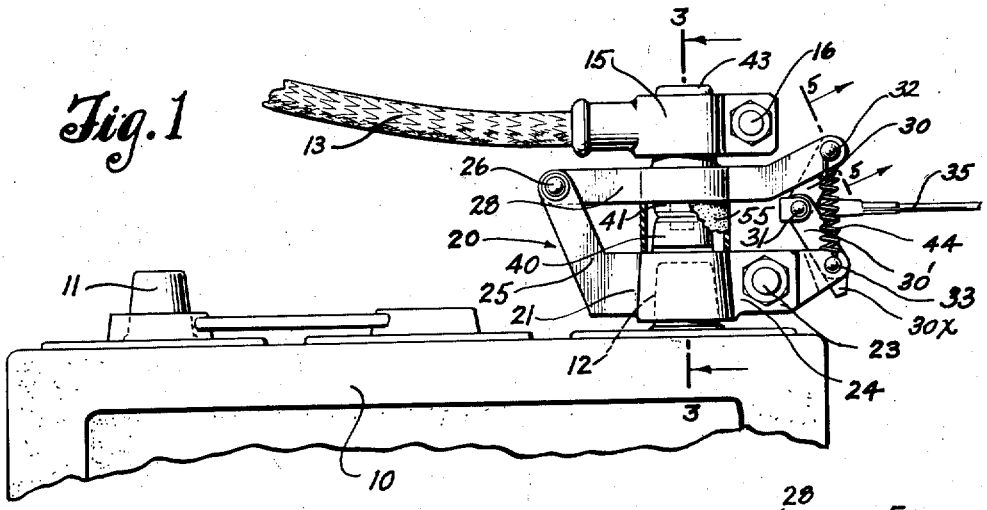
Fig. 1 is a side view of a part of a battery, equipped with a safety switch embodied by the present invention.
Figure 5:
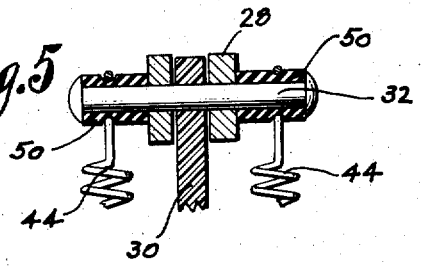
Fig. 5 is an enlarged sectional detail on line 5—5 in Fig. 1.

Referring more in detail to the drawings:

For purpose of illustrating the use of the present switch I have, in Fig. 1, shown a portion of a common form of storage battery and the usual form of battery cable whereby a circuit connection is made with one terminal of the battery. The battery is here designated by numeral 10, and its terminals are designated at 11 and 12. The battery cable is designated by numeral 13 and it is shown as being equipped with a split securing clamp 15, adapted to be applied to the terminal post 12 and tightened and secured by a clamp bolt 16.

Figure 2:
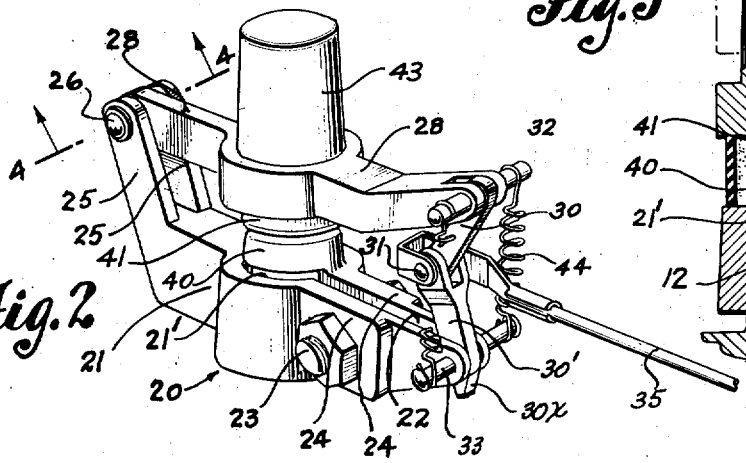
Fig. 2 is a perspective view of the present switch.

The present switch, as best shown in Fig. 2, comprises a base member which is in the nature of a securing clamp; this member being designated in its entirety by numeral 20. It comprises a horizontal mounting bar 21 formed with a tapered socket 21′ opening to the under side thereof and adapted to receive the battery terminal post 12 therein. At one side of the socket, the mounting bar is longitudinally split, as at 22, and a clamp bolt 23 is extended directly through the spaced end portions or legs 24—24 at opposite sides of the split. At the other side of the socket, the mounting bar is formed with two spaced, upwardly and outwardly directed legs 25—25, between the upper ends of which one end of a switch lever 28 is pivotally mounted by a pivot bolt 26 that is extended horizontally through these parts.

The lever 28 extends along and over the mounting bar 21, and at that end thereof which is opposite the end secured by pivot bolt 26, it is connected to the ends of legs 24—24 of the mounting bar through the mediacy of a switch actuating toggle linkage comprising a pair of links 30—30′ pivotally connected by a pivot pin 31. Link 30 is pivotally connected at its upper end to the lever 28 by a pivot pin 32. Link 30′ is connected at its lower end to the legs 24—24 of bar 21 by a pivot pin 33.

An actuating rod 35 is connected, at one end, to the toggle linkage through the mediacy of the pin 31. This rod may be extended to a dash board, instrument panel, or to other position accessible to an operator and there equipped with a suitable operating handle, not herein shown, whereby, by a pull on the rod, the switch will be opened and by a push on the rod, the switch will be closed.

Formed as an integral part of the mounting bar 21, at the top side and directly over the socket 21′, is a circuit contact boss 40 in the form of a horizontal disk. Likewise, formed on the under side of the switch lever 28 is a contact boss 41 in an opposed relationship to the contact 40, and adapted to be flatly engaged therewith upon closing the switch, and to be disengaged therefrom when the switch is opened, thus to close and open a circuit through the switch.

Figure 3:
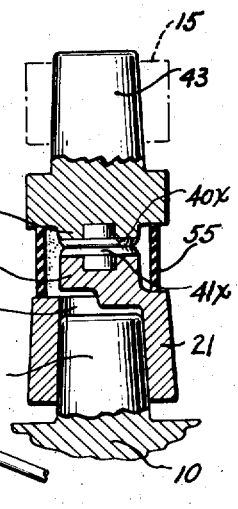
Fig. 3 is a vertical section through parts of the switch showing the terminal posts of the battery and switch and the switch contacts; the view being substantially on line 3—3 in Fig. 1.

As shown in Fig. 3, it is desirable that the contacts 40 and 41 be faced with buttons of silver, or the like, indicated at 40x and 41x in Fig. 3, to provide better circuit connections and to avoid pitting. On the top side of the switch lever 28 is an integral terminal post 43, preferably corresponding in size and shape to the terminal 12, and adapted to have the cable clamp 15 applied directly thereto as shown in Fig. 1, so that the same cable that ordinarily is applied to the battery terminal post 12, can be used with the switch.

The switch 20 is yieldingly held in closed position by one or more coiled springs 44 which are applied as shown in Fig. 1 across the toggle linkage. Preferably the ends of the springs 44 are hooked over the ends of the toggle attaching pins 32 and 33.

To disengage the switch contacts, it is only required that a pull be applied to rod 35 that will cause the straightening of the toggle linkage. This linkage, after passing from position shown in Fig. 1, very slightly over dead center can be stopped, thus to prevent the springs 44 again closing the switch. For such stopping of the linkage, the lower end of link 30' has been extended, as at 30x in Fig. 1, so as to engage against a shoulder in one of the mounting legs 24.

Figure 4:
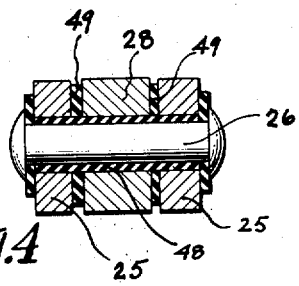
Fig. 4 is an enlarged sectional detail on line 4—4 in Fig. 2.

In order that opening of the switch will break the circuit connection the switch lever must be insulated from the mounting bar 21. In Fig. 4 it is shown that the pivot pin 26 is encased in an insulating sleeve 48 and the lever 28 is mounted for pivotal action on the insulated sleeve and is spaced from the legs 25 by insulating washers 49—49 applied about the sleeve. Likewise, at the other end of the switch lever 28, the upper ends of the springs 44 are applied to insulating bushings 50 fitted on the ends of pin 32. The toggle linkage is of "Bakelite," or of other material that is electrically non-conductive, thus there is not electrically non-conductive, thus there is not electrically conductive connection between parts 21 and 28 except through contacts 40 and 41.

To protect the contacts 40 and 41, it is desirable that they be enclosed in a compressible rubber sleeve 55, as shown in Figs. 1 and 3. This sleeve is located about the parts 40—41 between levers 21 and 28 and normally encloses the contacts in a weather-tight joint. It in no way interferes with the switch closing action.

Switches and operating mechanism of this kind afford easy and quick complete disconnection of the battery circuit from all instruments or motors supplied with current thereby. It not only provides a quick and easy means for disconnecting the battery for testing or repair of parts but also is a safety device whereby all circuits may be opened in case of emergency, as in crash landing of airplanes.

Switches of this kind may be made in various sizes and in various designs without departing from the spirit of the invention.

Having thus described my invention, what I claim as new therein and desire to secure by Letters Patent is:

1. A switch of the character described comprising a mounting bar of electrically conductive material formed on its under side with a downwardly opening socket adapted to receive therein the terminal post of a typical automobile battery; and having a contact boss integral therewith on its top side, intermediate its ends, a switch lever of electrically conductive material, disposed above and extending along the said mounting bar and having an insulated, hinged connection at one end with the corresponding end of the bar and having a contact boss on its under side adapted to be engaged with and disengaged from the contact boss on the mounting bar to make and break a circuit connection, by hinging action of said lever, and having a terminal post formed thereon corresponding in size and shape to the battery post for which the mounting bar socket is designed to receive, spring means joining the mounting bar and lever to urge the contact bosses thereon together, and a linkage joining the bar and lever and operable to move them apart to disengage the contact bosses.

*2. A switch of the character described comprising a mounting bar formed on its under side with a downwardly opening socket adapted to receive therein the terminal post of a typical battery; a contact boss integral with the mounting bar and projecting from its top side, intermediate its ends; a switch lever disposed above and extending along the said mounting bar and being in hinged connection at one end with the corresponding end of the bar, and a contact boss on the under side of the lever to engage with the contact boss on the mounting bar to make a circuit connection by hinging action of said lever, and a terminal post formed on the top side of the lever corresponding in size and shape to the battery post for which the mounting bar socket is designed to receive; spring means and manually operable means each associated with the lever to effect the engagement of the contact bosses.*

*3. A switch of the character described comprising a mounting bar formed on its under side with a downwardly opening socket adapted to receive therein the terminal post of a typical battery; a contact boss integral with the mounting bar and projecting from its top side, intermediate its ends; a switch lever disposed above and extending along the said mounting bar and being in hinged connection at one end with the corresponding end of the bar, and a contact boss on the under side of the lever to engage with the contact boss on the mounting bar to make a circuit connection by hinging action of said lever, and a terminal post formed on the top side of the lever corresponding in size and shape to the battery post for which the mounting bar socket is designed to receive; spring means joining the mounting bar and lever to urge the contact bosses thereon together, and means associated with the bar and lever operable to move them apart to disengage the contact bosses.*

*4. A switch as in claim 2 wherein a compressible sleeve is provided about the bosses whereby the bosses are in a weather-tight enclosure.*

References Cited in the file of this patent or the original patent

UNITED STATES PATENTS

| Number | Name | Date |
|---|---|---|
| 1,893,046 | Austin | Jan. 3, 1933 |
| 2,545,965 | McCamon | Mar. 20, 1951 |

FOREIGN PATENTS

| Number | Country | Date |
|---|---|---|
| 386,426 | Great Britain | Jan. 19, 1933 |